(12) United States Patent
Goldsmith

(10) Patent No.: US 10,913,432 B1
(45) Date of Patent: Feb. 9, 2021

(54) FENDER MOUNTED HOIST

(71) Applicant: Stephen Lynn Goldsmith, Hesperia, CA (US)

(72) Inventor: Stephen Lynn Goldsmith, Hesperia, CA (US)

( * ) Notice: Subject to any disclaimer, the term of this patent is extended or adjusted under 35 U.S.C. 154(b) by 0 days.

(21) Appl. No.: 17/015,334

(22) Filed: Sep. 9, 2020

(51) Int. Cl.
| | |
|---|---|
| *B60S 5/00* | (2006.01) |
| *B66F 7/26* | (2006.01) |
| *B66C 1/12* | (2006.01) |
| *B66C 1/42* | (2006.01) |
| *B66C 1/10* | (2006.01) |
| *B66C 5/02* | (2006.01) |

(52) U.S. Cl.
CPC ............... *B60S 5/00* (2013.01); *B66C 1/107* (2013.01); *B66C 1/12* (2013.01); *B66C 1/42* (2013.01); *B66C 5/02* (2013.01); *B66F 7/26* (2013.01)

(58) Field of Classification Search
CPC ......... B66C 1/107; B66C 5/04; B66C 19/005; B66C 23/36; B66C 23/365; B66D 1/60; B66D 3/02; B66D 3/04; B66D 3/26; B66D 2700/023; B60S 5/00; B66F 7/26
See application file for complete search history.

(56) References Cited

U.S. PATENT DOCUMENTS

| | | | | |
|---|---|---|---|---|
| 4,030,705 A | * | 6/1977 | Bontrager | ............... B66F 19/00 254/264 |
| 4,072,209 A | * | 2/1978 | Bolis | ....................... B25H 5/00 182/116 |
| 4,269,396 A | * | 5/1981 | Easterwood | ........... B66C 23/44 212/177 |
| 5,456,371 A | * | 10/1995 | Klann | ...................... B60S 5/00 180/298 |
| 5,782,459 A | * | 7/1998 | Klann | ..................... B66F 19/00 254/323 |
| 5,848,778 A | * | 12/1998 | Wagner | ............... B25H 1/0007 248/676 |
| 6,435,360 B1 | * | 8/2002 | Buchmeier | .............. B66C 1/10 212/180 |
| 6,598,859 B1 | | 7/2003 | Kureck | |
| 6,651,968 B2 | * | 11/2003 | Reyes | ..................... B25H 5/00 180/298 |
| 6,666,442 B1 | * | 12/2003 | Ploeger | ................... B23Q 1/52 269/46 |
| 7,891,626 B2 | * | 2/2011 | Lindberg | ............ B25H 1/0007 248/340 |

(Continued)

FOREIGN PATENT DOCUMENTS

WO    WO-2007027802 A2 *    3/2007    ............ B66C 1/107

*Primary Examiner* — Emmanuel M Marcelo
(74) *Attorney, Agent, or Firm* — Clement Cheng

(57) ABSTRACT

A fender mounted hoist has a frame having lifting points for receiving one or more ratchets. The frame is mounted over a fender well. The fender well includes a right fender well and a left fender well. The right fender well includes a right fender well inside frame, a right fender well base, and a right fender well wall. The left fender well includes a left fender well inside frame, a left fender well base, and a left fender well wall. A main beam has a left end of the main beam and a right end of the main beam. The main beam of the frame is horizontally oriented. A left leg is connected to the frame at the left end of the main beam, and a right leg is connected to the frame at the right end of the main beam.

16 Claims, 3 Drawing Sheets

(56) References Cited

U.S. PATENT DOCUMENTS

Figure 1:
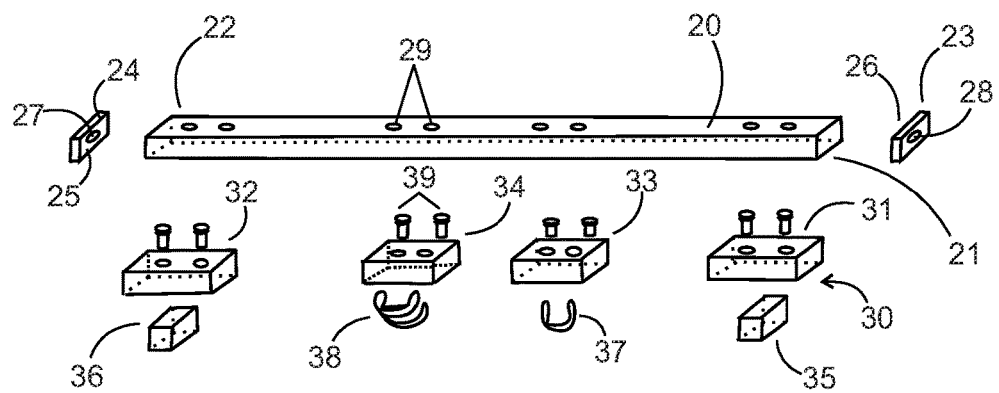
Figure 1:
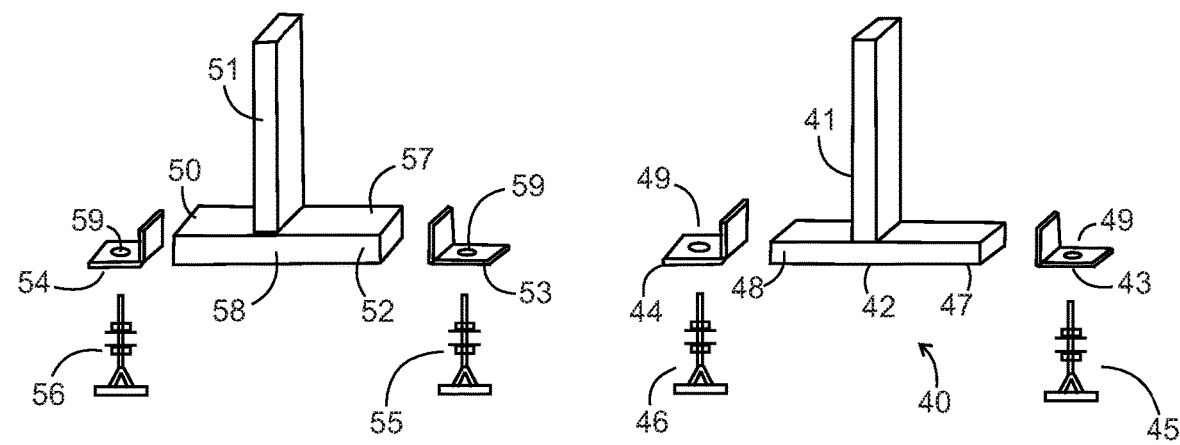
Figure 1:
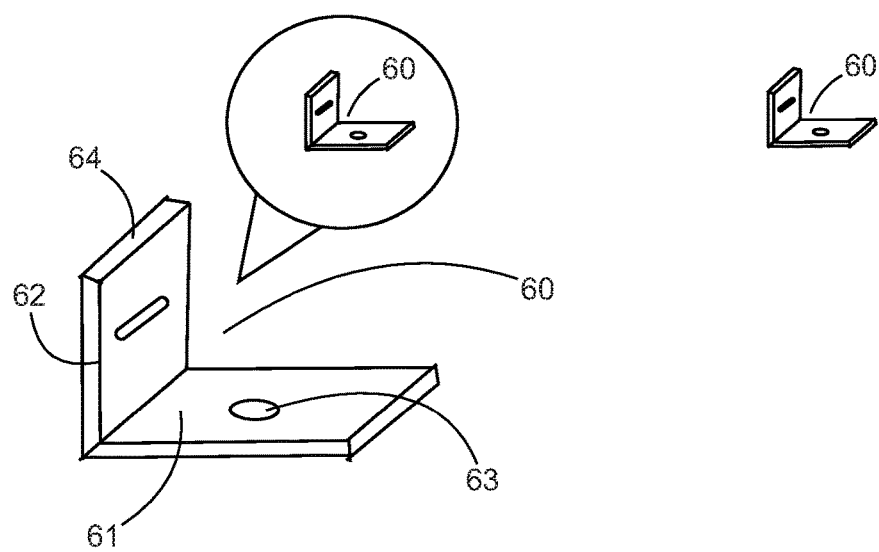

| | | | | |
|---|---|---|---|---|
| 8,226,140 | B1* | 7/2012 | Dietrich | B66C 1/107 |
| | | | | 294/119.1 |
| 8,366,373 | B2* | 2/2013 | Wood | B60P 1/5471 |
| | | | | 414/543 |
| 8,556,311 | B1* | 10/2013 | Lucero | B66C 1/107 |
| | | | | 294/67.33 |
| 10,029,893 | B2* | 7/2018 | Hancock | B66D 1/28 |
| 10,577,227 | B1 | 3/2020 | Napieralski | |
| 2008/0105638 | A1* | 5/2008 | Crawford | B25H 5/00 |
| | | | | 212/180 |
| 2013/0343862 | A1* | 12/2013 | Tindall | A61G 3/062 |
| | | | | 414/809 |
| 2015/0251774 | A1 | 9/2015 | Mercier | |
| 2018/0237273 | A1* | 8/2018 | Kreischer | B66C 1/10 |
| 2018/0265338 | A1* | 9/2018 | Motley | B66C 19/00 |
| 2019/0359267 | A1* | 11/2019 | Ng | B62D 55/06 |

* cited by examiner

FENDER MOUNTED HOIST

FIELD OF THE INVENTION

The present invention is in the field of automotive hoists.

BRIEF DISCUSSION OF RELATED ART

Automotive hoists typically require that a vehicle means to be a shop or automotive repair center. If an automobile or other vehicle breaks down in a remote location such as the wilderness, a hoist may be unavailable. Typically, hoists are mounted to the ground, and may have foundation or other hydraulic mechanisms that are tied to a concrete foundation structure such as an automotive garage or automobile repair center. What is needed is a hoist can be mounted in remote locations such as in the wilderness.

SUMMARY OF THE INVENTION

A fender mounted hoist has a frame with lifting points for receiving hooks of ratchets. A main beam of the frame supports lifting points that are configured to mount to and slide along the main beam. A base member of the frame includes a left base member and a right base member. Four adjustable leveler feet are mounted to the base member of the frame. Two pairs of safety straps are connected to a fender at an upper opening of a vehicle underneath the hood. The fender well is formed underneath the hood of the vehicle, and the fender mounted hoist is mounted in the fender well.

The hoist is mounted directly to the vehicle frame after opening the hood. The vehicle typically has a hood that swivels open to an open position. The hoist is mounted directly underneath the hood. The vehicle frame has a frame portion that connects to a left or right front fender. The fender connection typically has a pair of fender openings on the right side and a pair of openings on the left side. The fender openings may be covered by a screw or plastic cap. The fender connects to the frame of the vehicle in the front of the vehicle at a top fender joint. The top fender joint forms a fender shoulder that typically has a pair of fender openings on each side. The fenders have fender seams that are connected to the car frame which is welded. The fender wells are welded to the vehicle frame which is the chassis.

The main beam is preferably a 1¼" main square pipe. The main beam goes across and over the engine compartment. The main being is connected to a pair of side connectors that have lockdowns for the main support beam. The pair of side connectors are preferably 6 inches by 1½ inch square tube to receive the 1¼" main square pipe. A pair of safety strap anchors can be made of square pipe cut down to and welded to an underside of the pair of side connectors. The safety straps can be attached to the safety strap anchors.

The pair of side connectors connect to a base. The base has a vertical member and a horizontal member. The vertical member is preferably 18 inches high and the horizontal member is preferably 16 inches long. The horizontal member is preferably connected to a pair of brackets, namely a first horizontal member bracket and a second horizontal member bracket. The first horizontal member bracket can be a front horizontal member bracket and the second horizontal member bracket can be a rear horizontal member bracket. A total for brackets are used. The brackets are preferably welded to the horizontal member. Preferably, the brackets have an opening that receives a foot. The foot is height adjustable and should be able to support about 1200 pounds per padded foot. The foot is preferably height adjustable by screw adjustment. The feet are placed on the fender shoulder.

A pair of lift points and supports is mounted to slide along the main support beam. The lift points have 3½ inch long bolts that are U shaped and can be screwed or welded to the lift points. The lift points are also preferably made of rectangular steel pipe that is cut to small sections. Preferably, a pair of lift points is used, although three or more can be used. The lift points have a pair of U shaped bolts for retaining and connecting to whatever device needs to be lifted. The U-shaped bolts can be made as U-shaped steel loops. U shaped steel loops connect to ratchets that can be used for raising an engine or transmission for replacing an engine or transmission.

For more compact emergency usage, the main beam could be made in a pair of sections, namely a right section and a left section. It is preferred that the main beam is a single section. There are typically a pair of right fender openings and a pair of left fender openings on each side of a vehicle. Safety straps can be hooked into the fender openings. Safety straps may have a pair of hooks on each end with a ratchet in the middle. The ratchet provides tension. The pair of hooks connects between the safety strap anchor that is welded to the frame and the fender openings. A pair of front safety straps and a pair of rear safety straps are necessary. The front safety straps include a front right safety strap and a front left safety strap. The pair of rear safety straps includes a rear right safety strap and a rear left safety strap.

For greater security, the safety straps are preferably connected to a safety strap bracket that is connected to the fender openings. Preferably, the safety strap bracket is bolted to the fender opening and then the safety strap is hooked onto the safety strap bracket. The safety strap bracket preferably has a bolt opening for bolting to the fender opening and the safety strap bracket or verbally has a slot opening for receiving a lower safety strap hook. The safety strap bracket bolt opening is on a lower horizontal portion of the bracket and the safety strap slot opening is on an upper vertical portion of the bracket. The safety strap slot opening is preferably horizontal. The safety strap bracket is an L shaped bracket.

User assembly should begin by first assembling the frame with the base members attached to the main beam. Once the frame is assembled and the lift points are positioned on the main beam, the safety strap brackets are connected to the vehicle and the safety straps are installed between the safety strap anchors and the safety strap brackets. The safety straps are then tightened. The user then checks the overall stability of the frame, such as like pulling on it in various directions. The user can then hook on the ratchets also called 'come alongs' where the ratchets are gear driven and have a pivoting reciprocating handle that contracts the distance between the pair of hooks of the ratchets. Similarly, the safety straps have a contracting mechanism that produces appropriate tension.

SUMMARY OF THE CLAIMS

A fender mounted hoist has a frame having lifting points for receiving one or more ratchets. The frame is mounted over a fender well. The fender well includes a right fender well and a left fender well. The right fender well includes a right fender well inside frame, a right fender well base, and a right fender well wall. The left fender well includes a left fender well inside frame, a left fender well base, and a left fender well wall. A main beam has a left end of the main beam and a right end of the main beam. The main beam of the frame is horizontally oriented. A left leg is connected to the frame at the left end of the main beam, and a right leg is connected to the frame at the right end of the main beam.

The left leg and the right leg provide a vertical support for the main beam. A pair of right adjustable leveler feet is mounted to the right support member. The pair of right adjustable leveler feet includes a right front foot and a right rear foot. The right support member further includes a right support member front end and a right support member rear end. The right front foot is mounted to the right leg front end, and the right rear foot is mounted to the right leg rear end. The right front foot and the right rear foot are mounted to the right fender well.

A pair of left adjustable leveler feet is mounted to the left support member. The pair of left adjustable leveler feet includes a left front foot and a left rear foot. The left support member further includes a left support member front end and a left support member rear end. The left front foot is mounted to the left leg front end, and the left rear foot is mounted to the left leg rear end. The left front foot and the left rear foot are mounted to the left fender well.

The right front foot and the right rear foot are mounted to the right fender well base in the right fender well, and the left front foot and the left rear foot are mounted in the left fender well base in the left fender well. A left anchor collar is connected to an upper end of the left leg, and a right anchor collar is connected to an upper end of the right leg. The left anchor collar is welded to the upper end of the left leg. The left anchor collar is bolted to the left end of the main beam. The right anchor collar is welded to an upper end of the right leg. The right anchor collar is bolted to the right end of the main beam.

A right safety strap and a left safety strap maintain dimensional stability of the frame and resists tipping. The right safety strap is connected to the right anchor collar, and the left safety strap is connected to the left anchor collar. The right safety strap is connected to the right fender well and the left safety strap is connected to the left fender well.

A right tiedown bracket and a left tiedown bracket can be bolted or screwed to the vehicle frame. The right tiedown bracket is connected to the right fender well and the left tiedown bracket is connected to the left fender well. The right tiedown bracket is connected to the right safety strap, and the left tiedown bracket is connected to the left safety strap. A right anchor collar extension extends downwardly from the right anchor collar and a left anchor collar extension, and the left anchor collar extension extends downwardly from the left anchor collar.

The lifting points are configured as a right hoist collar and a left hoist collar. The right hoist collar and the left hoist collar slide over the main beam. The right hoist collar receives a right ratchet lift, and the left hoist collar receives a left ratchet lift. The right hoist collar has a right hoist loop, and the left hoist collar has a left hoist loop.

The right hoist collar has a right hoist loop, and the left hoist collar has a left hoist loop. The right hoist loop and the left hoist loop both have a U bolt shape with upwardly oriented threaded tips that receive nuts on an upper surface of the main beam, wherein the right ratchet left has a right ratchet lift handle, and wherein the left ratchet lift has a right left ratchet lift handle.

A right anchor collar extension extends downwardly from the right anchor collar and a left anchor collar extension. The left anchor collar extension extends downwardly from the left anchor collar. The lifting points are configured as a right hoist collar and a left hoist collar. The right hoist collar and the left hoist collar slide over the main beam. The right hoist collar receives a right ratchet lift, and the left hoist collar receives a left ratchet lift. The right hoist collar has a right hoist loop, and the left hoist collar has a left hoist loop. The right hoist collar has a right hoist loop, and the left hoist collar has a left hoist loop. The right hoist loop and the left hoist loop both have a U bolt shape. The right ratchet left has a right ratchet lift handle, and the left ratchet lift has a right left ratchet lift handle so that a user can ratchet the right and left handles alternatively for raising a right and left side of the vehicle engine.

BRIEF DISCUSSION OF THE DRAWINGS

Figure 2:
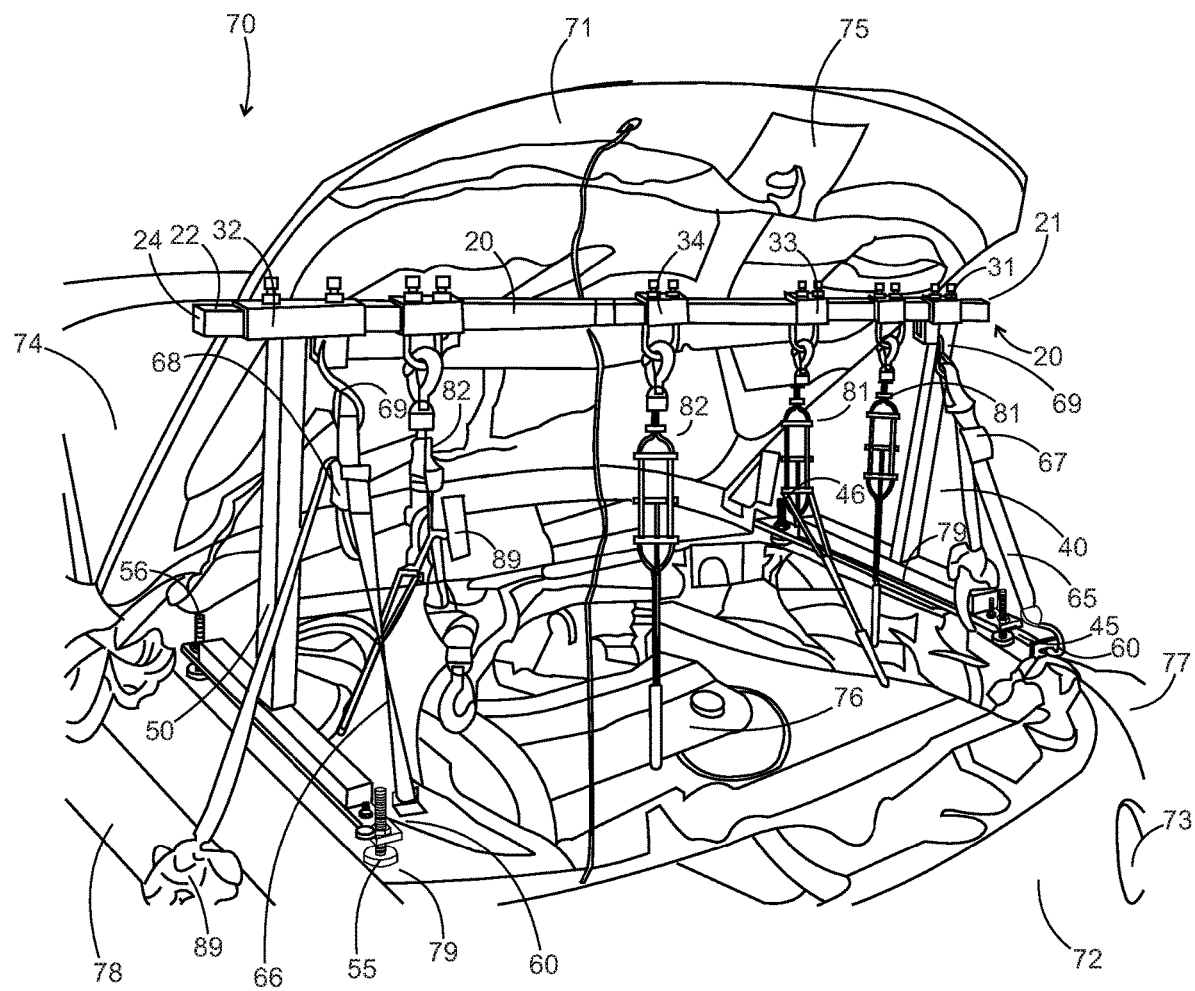
Figure 3:
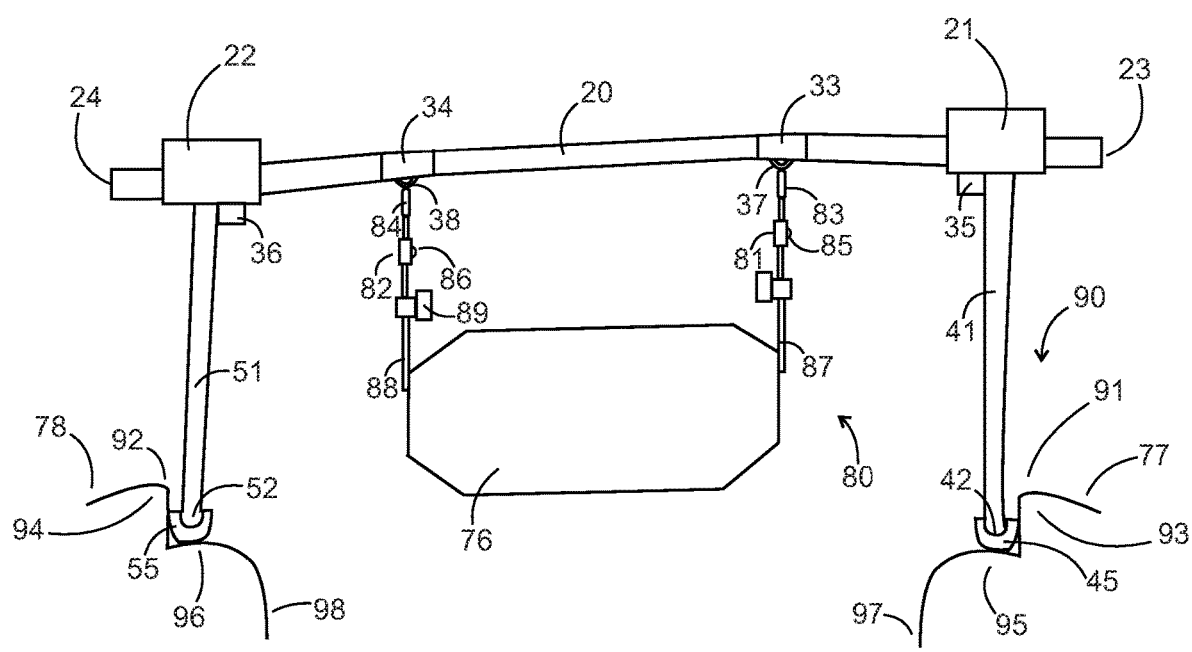

FIG. 1 is an exploded view showing assembly of the hoist.
FIG. 2 is a perspective view showing usage of the hoist.
FIG. 3 is a diagram showing attachment of the hoist to the vehicle engine.

The following call out list of elements can be a useful guide in referencing the element numbers of the drawings.
20 Main Beam
21 Main Beam Right End
22 Main Beam Left End
23 Right End Cap
24 Left End Cap
25 Left End Cap Edge
26 Right End Cap Edge
27 Left End Cap Opening
28 Right End Cap Opening
29 Main Beam Opening
30 Collar Set
31 Right Anchor Collar
32 Left Anchor Collar
33 Right Hoist Collar
34 Left Hoist Collar
35 Right Anchor Collar Extension
36 Left Anchor Collar Extension
37 Right Hoist Loop
38 Left Hoist Loop
39 Collar Bolts
40 Right Leg Member
41 Right Leg Vertical Member
42 Right Leg Horizontal Member
43 Right Frontal Bracket
44 Right Rear Bracket
45 Right Front Foot
46 Right Rear Foot
47 Right Leg Front End
48 Right Leg Rear End
49 Right Foot Mount
50 Left Leg Member
51 Left Leg Vertical Member
52 Left Leg Horizontal Member
53 Left Front Bracket
54 Left Rear Bracket
55 Left Front Foot
56 Left Rear Foot
57 Left Leg Front End
58 Left Leg Rear End
59 Left Foot Mounted
60 Tie Down Bracket
61 Tie Down Bracket Base
62 Tie Down Bracket Extension
63 Tie Down Bracket Opening
64 Tie Down Bracket Slot
65 Right Tie Down Line
66 Left Tie Down Line 67 Right Tie Down Buckle
68 Left Tie Down Buckle
69 Upper Tie Down Hook
70 Vehicle
71 Vehicle Hood
72 Vehicle Front Fender
73 Vehicle Head Light
74 Vehicle Windshield
75 Hood Latch
76 Engine
77 Right Fender
78 Left Fender
79 Fender Well
80 Ratchets
81 Right Ratchet Lift
82 Left Ratchet Lift
83 Right Ratchet Lift Upper Hook
84 Left Ratchet Lift Upper Hook
85 Right Ratchet Lift Handle
86 Left Ratchet Lift Handle
87 Right Ratchet Lift Strap
88 Left Ratchet Lift Strap
89 Strap Bundle
90 Fender Wells
91 Right Fender Wells
92 Left Fender Wells
93 Right Fender Well Wall
94 Left Fender Well Wall
95 Right Fender Well Base
96 Left Fender Well Base
97 Right Fender Well Inside Frame
98 Left Fender Well Inside Frame

DETAILED DESCRIPTION OF THE PREFERRED EMBODIMENTS

As seen in FIG. 1, the exploded view of the present invention shows a main beam 20 having a main beam right end 21 and a main beam left end 22. The main beam 20 can be made of tubular steel such as 1½ tubular steel. The main beam 20 preferably has a right end cap 23 formed as a rectangular or square plate welded to the main beam right end 21. Similarly, the main beam 20 preferably has a left end cap 24 formed as a rectangular or square plate welded to the main beam left end 22. The left end cap edge 25 and the right end cap edge 26 can be welded to the external edge of the tubular steel stock. After welding, the ends are preferably finished. The left end cap 24 left preferably has an end cap opening 27, and the right and cap 23 preferably has a right end cap opening 28.

The main beam has a main beam upper surface, a main beam lower surface, a main beam front surface and a main beam rear surface in orthogonally oriented rectangular configuration. The main beam upper surface may receive a main beam opening 29 which is drilled after positioning a variety of different collars that slide to the main beam. A collar set 30 has a right anchor collar 31 and a left anchor collar 32 that fit on the main beam 20. The right hoist collar 33 and the left hoist collar 34 also slide onto the main beam 20 so that the right hoist collar 33 is to the right of the left hoist collar 34.

The right hoist loop 37 can be mounted to the right anchor collar extension 35, and the left hoist loop 38 can be mounted to the left anchor collar extension 36 using collar bolts 39. The right hoist loop 37 and the left hoist loop 38 can be formed as threaded U bolts that have nuts and pass through the main beam 20 upper surface, and main beam lower surface.

The right anchor collar 31 is preferably welded to the right anchor collar extension 35, and the left anchor collar 32 is preferably welded to the left anchor collar extension 36. The right leg member 40 can be welded to the right anchor collar extension 35 or the right anchor collar 31.

The right leg member 40 has a right leg vertical member 41 welded to a right leg horizontal member 42. The right leg horizontal member 42 has a front end a rear end, namely a right leg front end 47 and a right leg rear end 48. The right leg horizontal member front end can receive a right front bracket 43, and the right leg horizontal member rear end can receive a right rear bracket 44. A right front foot 45 can be mounted to the right front bracket 43. A right rear foot 46 can be mounted to the right rear bracket 44.

The right front foot and the right rear foot can be mounted on their respective right foot mount 49 which can be an opening formed on the right front bracket 43 or the right rear bracket 44. The right front bracket 43 and the right rear bracket 44 can be formed by cutting away a portion of the right leg horizontal member 42, or by welding an angle iron bracket section to the right leg front end 47 and right leg rear end 48.

Analogously, the left leg member 50 has a left leg vertical member 51 welded to a left leg horizontal member 52. The left leg horizontal member 52 has a front end a rear end, namely a left leg front end 57 and a left leg rear end 58. The left leg horizontal member front end can receive a left front bracket 53, and the left leg horizontal member rear end can receive a left rear bracket 54. A left front foot 55 can be mounted to the left front bracket 53. A left rear foot 56 can be mounted to the left rear bracket 54.

The left front foot and the left rear foot can be mounted on their respective left foot mount 59 which can be an opening formed on the left front bracket 53 or the left rear bracket 54. The left front bracket 53 and the left rear bracket 54 can be formed by cutting away a portion of the left leg horizontal member 52, or by welding an angle iron bracket section to the left leg front end 57 and left leg rear end 58.

The right anchor collar extension and the left anchor collar extension are preferably connected to straps that are then connected to one or more tie down brackets. A tie down bracket 60 has a tie down bracket opening 63 on a tie down bracket base 61. The tie down bracket opening 63 preferably has a bolt passing through it for retaining the tie down bracket to the vehicle frame. The vehicle frame can be and is preferably the fender frame which is typically formed as a stamped metal space frame in modern vehicles. The tie down bracket 60 has a tie down bracket extension 62 extending upwardly. The tie down bracket extension 62 has a tie down bracket slot 64 which receives the tiedown strap or line.

As seen in FIG. 2, a vehicle 70 has a vehicle hood 71 with a vehicle front fender 72. The vehicle 70 also has vehicle head lights 73 and a vehicle windshield 74. The vehicle hood 71 has a hood latch 75. Underneath the vehicle hood 71 is an engine 76. The vehicle 70 has a right fender 77 and a left fender 78 both having a fender well 79. The fender well 79 passes along the periphery of the right fender, the fender and front fender where the hood closes to the fender.

The fender mounted hoist is mounted above the engine 76 and below the vehicle hood 71. The vehicle hood 71 may need to be modified for receiving the fender mounted hoist. The fender mounted hoist has a main beam 20 with a main beam right end 21 and a main beam left end 22. The left anchor collar 32 is mounted at the main beam left end 22.

The right anchor collar 31 is mounted to the main beam right end 21. And the left anchor collar is mounted to the main beam left end 22.

One or two right hoist collars 33 can support a right side of an engine, and one or two left hoist collars 34 can support the left side of an engine. The right leg member 40 and the left leg member 50 support the main beam 20 at the main beam right end 21 and the main beam left end 22. The right leg member 40 is bolted to the main beam and welded to the right anchor collar and the left anchor collar. Preferably, the feet namely the right front foot 45, the right rear foot 46, the left front foot 55, and the left rear foot 56 are height adjustable for leveling and ball mounted for contacting and engaging angled surfaces of the fender well upper surface. The fender well upper surface is underneath the hood when the hood is closed.

Due to the feet being both height adjustable and angle adjustable, at least two tie down brackets 60 are used. The tiedown brackets are bolted to the vehicle frame. The vehicle frame may have a variety of different locations which may receive the tiedown brackets. A user may need to drill holes in the vehicle frame for receiving the tiedown brackets. The right tie down line 65 is preferably mounted to the right anchor collar extension 35 at upper tie down hook 69. Preferably a right tie down buckle 67 retracts excess slack line and allows the user to retain excess slack line in a strap bundle 89. The strap bundle 89 can be retained with a biasing means such as an elastic band for example. Similarly, the left tie down line 66 may also have a left tie down buckle 68 for retracting excess slack line for retaining the excess strap in a strap bundle 89.

A right ratchet lift 81 can be mounted to the right hoist collar, and a left ratchet lift 82 can be mounted to the left hoist collar. The ratchet lifts ratchet the line or strap so as to raise the engine. A user may alternatively actuate the right and left ratchet lifts.

As seen in FIG. 3, a diagram of the present invention shows the mounting structure with a single right ratchet left and a single lift ratchet lift. The main beam 20 has an extending main beam right end 21 with a right end cap 23 opposite a main beam left end 22 with a left end cap 24.

The main beam 20 has an outside dimension which is smaller than an inside dimension of the right hoist collar 33 and the left hoist collar 34 to allow the right hoist collar 33 and the left hoist collar 34 to mount to the external surface of the main beam 20. The right hoist collars 33 and the left hoist collar 34 preferably attach to the main beam 20 by screws, or bolts. The right hoist loop 37 and the left hoist loop 38 when formed as U shaped bolts can respectively each attach to the hoist collars with a pair of holes through the hoist collars and the main beam 20.

The right anchor collar extension 35 is preferably welded to the right leg vertical member 41 and the left anchor collar extension 36 is preferably welded to the left leg vertical member 51. The right leg horizontal member 42 can be formed as a square cross-section tube of the same dimensions as the main beam 20, and a right front foot 45 can be mounted directly to a front end of the right leg horizontal member 42. Similarly, the left leg horizontal member 52 has a left front foot 55 which can also be mounted directly to a front end of the left leg horizontal member 52. Direct mounting of the foot can be drilling a hole through the square section tube and passing a threaded foot shaft through the horizontal member.

The engine 76 is supported by the right fender 77 and the left fender 78, but not by an external portion of the right fender 77 and the left fender 78. Ratchets 80 may include a right ratchet lift 81 and a left ratchet lift 82. The right ratchet may connect to the right hoist collar 33 at a right ratchet lift upper hook 83. The left ratchet may connect to the left hoist collar 34 at a left ratchet lift upper hook 84. A user may alternatively actuate a right ratchet lift handle 85 and a left ratchet lift handle 86 to slowly ratchet up the engine. A strap, line or other tension member can connect to the ratchets. The right ratchet lift strap 87 and the left ratchet lift strap 88 are preferably balanced for safety.

The fender wells 90 include the right fender well 91 and the left fender well 92. The right fender well 91 has a right fender well wall 93 and the left fender well 92 has a left fender well wall 94. The right fender well base 95 supports the right front foot 45, and the right rear foot 46, while the left fender well base 96 supports the left front foot 55, and the left rear foot 56. The right fender well inside frame 97 and the left fender well inside frame 98 preferably receive the tiedown brackets 60, however a user may need to drill an additional hole for the bolt connection for the tiedown bracket 60. The fender well base is horizontally oriented and bends upwardly to the fender well wall. The fender well wall bends outwardly to an external portion of the fender. The feet are mounted so that they stand on the fender well base. The sides of the right fender well wall and the left fender well wall bias and retain the rigid frame of the present invention fender mounted hoist. The right fender well wall exerts a rightward support on a right surface of the right front foot 45 and the right rear foot 46. The left fender well wall exerts a leftward support on a left surface of the left front foot 55 and the left rear foot 56.

With the strap down, the resultant frame is stable enough to raise and position an engine to allow a single user to single-handedly replace a transmission for example. Although a user cannot use the device to completely remove the engine from the vehicle, many repairs and automotive procedures do not require complete removal from the engine from the vehicle, and partial removal or raising is enough to complete the procedure.

The invention claimed is:

1. A fender mounted hoist comprising:
   a. a frame having lifting points for receiving one or more ratchets, wherein the frame is configured to be mounted over a fender well, wherein the fender well includes a right fender well and a left fender well, wherein the right fender well includes a right fender well inside frame, a right fender well base, and a right fender well wall, and wherein the left fender well includes a left fender well inside frame, a left fender well base, and a left fender well wall;
   b. a main beam of the frame, wherein the main beam has a left end of the main beam and a right end of the main beam, wherein the main beam of the frame is horizontally oriented;
   c. a left leg and a right leg, wherein the left leg is connected to the frame at the left end of the main beam, and wherein the right leg is connected to the frame at the right end of the main beam, wherein the left leg and the right leg provide a vertical support for the main beam;
   d. a pair of right adjustable leveler feet mounted to a right support member, wherein the pair of right adjustable leveler feet includes a right front foot and a right rear foot, wherein the right support member further includes a right support member front end and a right support member rear end, wherein the right front foot is mounted to a right leg front end, and wherein the right rear foot is mounted to a right leg rear end, wherein the right front foot and the right rear foot are mounted to the right fender well; and e. a pair of left adjustable leveler feet mounted to a left support member, wherein the pair of left adjustable leveler feet includes a left front foot and a left rear foot, wherein the left support member further includes a left support member front end and a left support member rear end, wherein the left front foot is mounted to a left leg front end, and wherein the left rear foot is mounted to a left leg rear end, wherein the left front foot and the left rear foot are mounted to the left fender well.

2. The fender mounted hoist of claim 1, wherein the right front foot and the right rear foot are mounted to the right fender well base in the right fender well, and wherein the left front foot and the left rear foot are mounted in the left fender well base in the left fender well.

3. The fender mounted hoist of claim 1, further comprising a left anchor collar connected to an upper end of the left leg, and further comprising a right anchor collar connected to an upper end of the right leg.

4. The fender mounted hoist of claim 3, wherein the left anchor collar is welded to the upper end of the left leg, wherein the left anchor collar is bolted to the left end of the main beam, and wherein the right anchor collar is welded to the upper end of the right leg, wherein the right anchor collar is bolted to the right end of the main beam.

5. The fender mounted hoist of claim 3, further including a right safety strap and a left safety straps, wherein the right safety strap is connected to the right anchor collar, and wherein the left safety strap is connected to the left anchor collar, and wherein the right safety strap is connected to the right fender well and wherein the left safety strap is connected to the left fender well.

6. The fender mounted hoist of claim 5, further comprising a right tiedown bracket and a left tiedown bracket, wherein the right tiedown bracket is connected to the right fender well, wherein the left tiedown bracket is connected to the left fender well, wherein the right tiedown bracket is connected to the right safety strap, wherein the left tiedown bracket is connected to the left safety strap.

7. The fender mounted hoist of claim 3, further comprising a right anchor collar extension, wherein the right anchor collar extension extends downwardly from the right anchor collar and a left anchor collar extension, wherein the left anchor collar extension extends downwardly from the left anchor collar.

8. The fender mounted hoist of claim 1, wherein the lifting points are configured as a right hoist collar and a left hoist collar, wherein the right hoist collar and the left hoist collar slide over the main beam, wherein the right hoist collar receives a right ratchet lift, and wherein the left hoist collar receives a left ratchet lift.

9. The fender mounted hoist of claim 8, wherein the right hoist collar further includes a right hoist loop, and wherein the left hoist collar includes a left hoist loop.

10. The fender mounted hoist of claim 8, wherein the right hoist collar further includes a right hoist loop, and wherein the left hoist collar includes a left hoist loop, wherein the right hoist loop and the left hoist loop both have a U bolt shape, wherein the right ratchet left has a right ratchet lift handle, and wherein the left ratchet lift has a right left ratchet lift handle.

11. The fender mounted hoist of claim 10, further comprising a left anchor collar connected to an upper end of the left leg, and further comprising a right anchor collar connected to an upper end of the right leg.

12. The fender mounted hoist of claim 11, wherein the left anchor collar is welded to the upper end of the left leg, wherein the left anchor collar is bolted to the left end of the main beam, and wherein the right anchor collar is welded to an upper end of the right leg, wherein the right anchor collar is bolted to the right end of the main beam.

13. The fender mounted hoist of claim 11, further including a right safety strap and a left safety straps, wherein the right safety strap is connected to the right anchor collar, and wherein the left safety strap is connected to the left anchor collar, and wherein the right safety strap is connected to the right fender well and wherein the left safety strap is connected to the left fender well.

14. The fender mounted hoist of claim 13, further comprising a right tiedown bracket and a left tiedown bracket, wherein the right tiedown bracket is connected to the right fender well, wherein the left tiedown bracket is connected to the left fender well, wherein the right tiedown bracket is connected to the right safety strap, wherein the left tiedown bracket is connected to the left safety strap.

15. The fender mounted hoist of claim 11, further comprising a right anchor collar extension, wherein the right anchor collar extension extends downwardly from the right anchor collar and a left anchor collar extension, wherein the left anchor collar extension extends downwardly from the left anchor collar.

16. The fender mounted hoist of claim 11, wherein the main beam is made of metal square tube having a main beam top surface, main beam bottom surface, main beam front surface and main beam rear surface.

* * * * *